United States Patent [19]

Imamiya

[11] Patent Number: 5,409,318
[45] Date of Patent: Apr. 25, 1995

[54] FONT GENERATION METHOD AND APPARATUS WITH SINGLE FONT MEMORY FOR SERVING DIFFERENT SCAN FORMATS

[75] Inventor: Hitoshi Imamiya, Tokyo, Japan

[73] Assignee: NEC Corporation, Tokyo, Japan

[21] Appl. No.: 878,263

[22] Filed: May 4, 1992

[30] Foreign Application Priority Data

May 2, 1991 [JP] Japan .................................. 3-128321

[51] Int. Cl.6 ............................................. G06F 12/02
[52] U.S. Cl. ..................... 400/76; 395/110; 395/151
[58] Field of Search ............ 400/188, 121, 76, 61; 395/110, 137, 150, 151; 345/192, 195

[56] References Cited

U.S. PATENT DOCUMENTS

| | | | |
|---|---|---|---|
| 4,635,212 | 1/1987 | Hatazawa | 395/137 |
| 4,752,828 | 6/1988 | Chapuis | 395/137 |
| 4,841,453 | 6/1989 | Finlay | 395/151 |
| 4,843,405 | 6/1989 | Morikawa | 395/137 |
| 4,995,089 | 2/1991 | Altrieth, III | 400/76 |
| 5,067,167 | 11/1991 | Berger | 395/137 |
| 5,081,700 | 1/1992 | Crozier | 395/137 |

FOREIGN PATENT DOCUMENTS

| | | | |
|---|---|---|---|
| 109658 | 5/1987 | Japan | 400/121 |
| 280658 | 11/1988 | Japan | 400/121 |

Primary Examiner—David A. Wiecking
Assistant Examiner—Steven S. Kelley
Attorney, Agent, or Firm—Foley & Lardner

[57] ABSTRACT

A font generation apparatus comprises a memory in which font data, which represents a matrix of dots or the outline of a font, is stored. The logic states of the stored bits are converted so that a bit pattern created by the converted bits represents a reflection of the bit pattern of the originally stored font data with respect to a line which equally divides the matrix, and the logic states of the bits stored in the memory are further converted so that a bit pattern created by the further conversion represents a rotation of the reflected bit pattern by 90 degrees.

12 Claims, 7 Drawing Sheets

FONT GENERATION METHOD AND APPARATUS WITH SINGLE FONT MEMORY FOR SERVING DIFFERENT SCAN FORMATS

BACKGROUND OF THE INVENTION

The present invention relates to a font generation technique particularly for printers and the like.

According to conventional printing techniques, dot-matrix fonts are stored in a bit pattern, which is scanned along successive rows (raster scan format) or scanned along successive columns (column scan format). The raster scan format is employed by page printers and the column scan format is employed by serial printers such as dot impact printers. For printing outline fonts, which represents the outline of a font by a coordinate system, two bit map converters are usually provided respectively for raster and column scan formats.

If a font generation apparatus serves different types of printers, it must be provided with two memories for different scan formats for printing bit-map fonts, and two bit map converters for different scan formats for printing outline fonts.

SUMMARY OF THE INVENTION

It is therefore an object of the present invention to provide a font generation method and apparatus which needs only one memory for printing bit-map fonts. Another object of the present invention is to provide a font generation apparatus which requires only one type of bit map converter for printing outline fonts.

According to a first aspect of the present invention, there is provided a font generation apparatus which comprises a memory having cells arranged in a matrix of rows and columns. Font data, which represents a matrix of dots, is stored in the memory. The logic states of the bits stored in the memory are converted so that the dots created by the converted bits represent a reflection of the dots of the originally stored font data with respect to a line which equally divides the matrix, and the logic states of the stored bits are further converted so that the dots created by the further conversion represent a rotation of the reflected dots by 90 degrees.

According to a second aspect of this invention, there is provided a font generation apparatus comprising a memory for storing outline font data bits representing the outline of a font in a coordinate system. The logic states of the bits stored in the memory are converted so that a bit pattern created by the converted bits represent a reflection of the bit pattern of the originally stored font data with respect to a line which equally divides the matrix, and the logic states of the stored bits are further converted so that a bit pattern created by the further conversion represents a rotation of the reflected bit pattern by 90 degrees. The outline font data bits stored in the memory are converted into a bit map pattern.

In a specific aspect, the reflection of the font pattern is achieved by recalling two bits respectively from different cells of the memory which are located symmetrically with respect to the line, and compared with each other and comparing the logic states of the recalled bits with each other. If they differ from each other, the logic states of these bits are reversed and stored back into the memory. The rotation of the font pattern is achieved by repeatedly recalling four bits respectively from different cells of the memory which are located symmetrically with respect to a center point of the matrix, comparing every two adjacent ones of the recalled four bits, reversing logic state of one of the adjacent two bits if the logic states of the adjacent bits differ from each other, and storing the reversed bit back into the cell from which the bit is recalled.

BRIEF DESCRIPTION OF THE DRAWINGS

The present invention will be described in further detail with reference to the accompanying drawings, in which.

DETAILED DESCRIPTION

Figure 1:
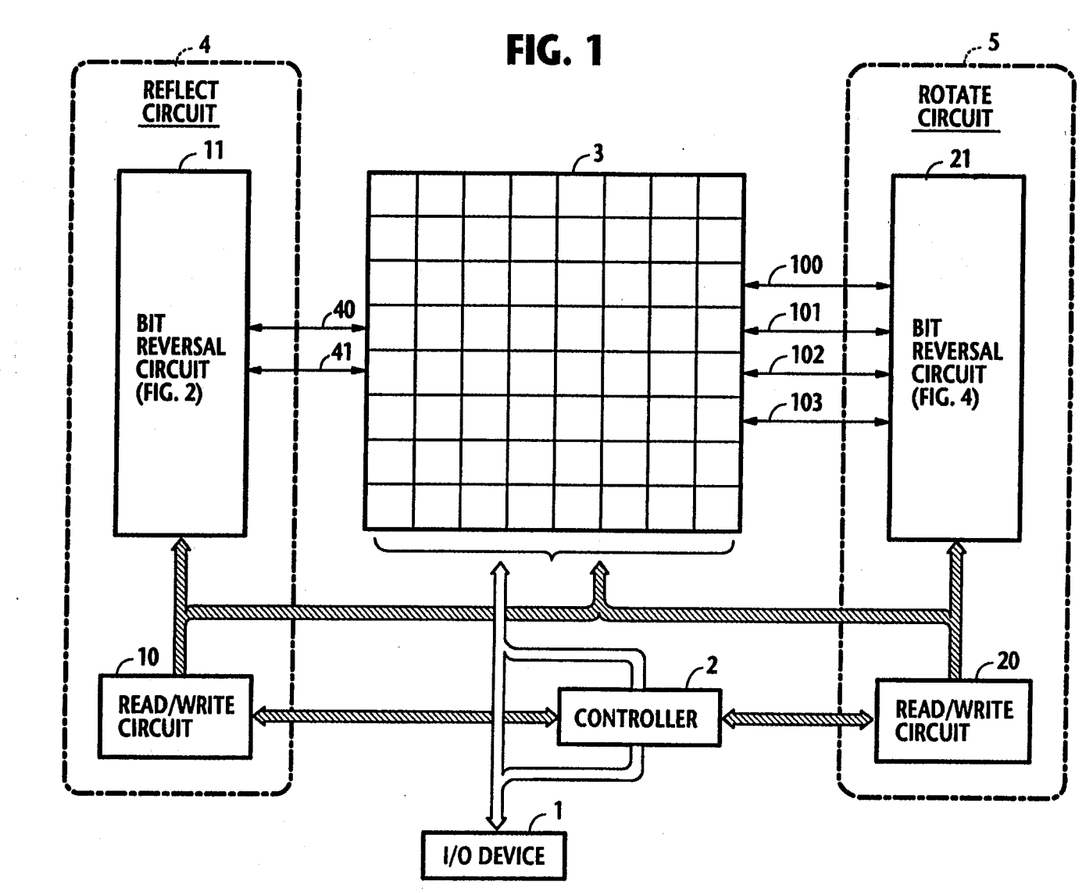
FIG. 1 is a block diagram of a font generation apparatus for processing bit-mapped fonts according to one embodiment of the present invention.

Referring now to FIG. 1, there is shown a font generation apparatus according to one embodiment of the present invention. The apparatus generally comprises an input/output device 1 which serves as an interface between the apparatus and external circuitry, a sequence controller 2 which provides overall sequence control, and a font memory 3 for storing fonts supplied from the I/O device under control of controller 2 in a bit-mapped format.

According to the present invention, a reflect circuit 4 and a rotate circuit 5 are connected to the font memory for providing reflect and rotate control over the stored bits in memory 3 in response to command signals from controller 2. Reflect circuit 4 includes a read/write circuit 10 and a bit reversal circuit 11. Read/write circuit 10 is connected to sequence controller 2 and memory 3. In a manner to be described, read/write circuit 10 reads a pair of bits of a stored font from memory 3 into bit reversal circuit 11 and stores a processed version of the bits back into memory 3. Rotate circuit 5 likewise includes a read/write circuit 20 and a bit reversal circuit 21. Read/write circuit 20 is connected to controller 2 and memory 3 to read a set of four bits of a stored font from memory 3 into bit reversal circuit 21 and stores a processed version of the bits back into memory 3.

Figure 2:
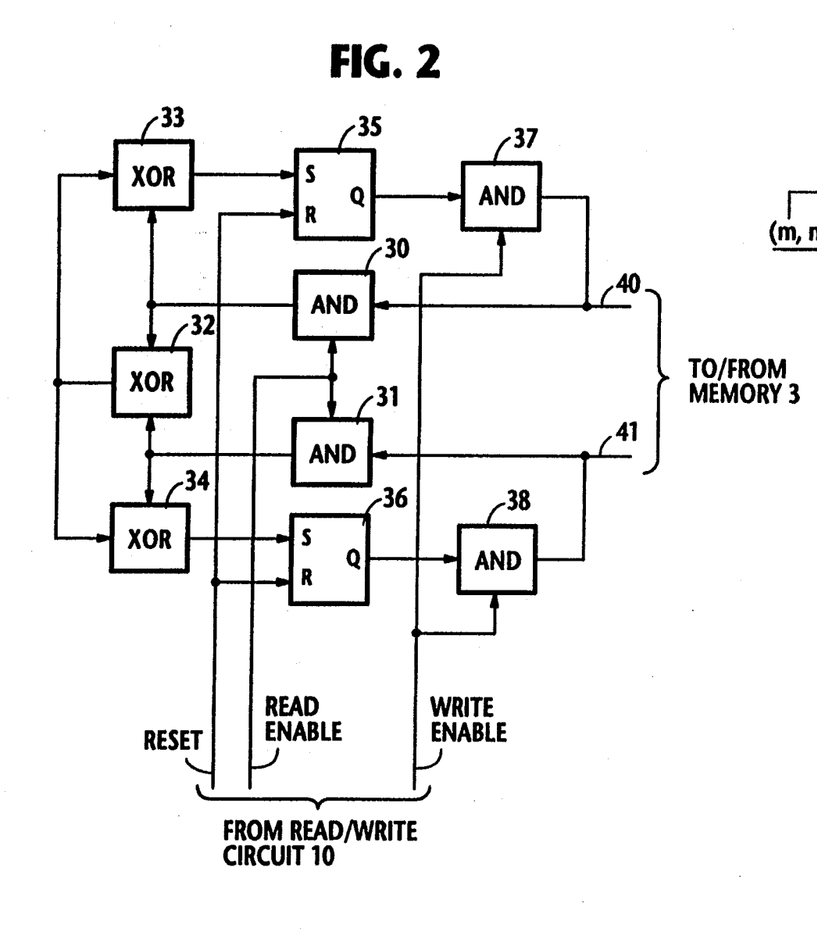
FIG. 2 is a circuit diagram of a bit reversal circuit for reflecting a stored bit pattern.

As shown in detail in FIG. 2, reflect circuit 4 comprises AND gates 30 and 31 that are arranged to be enabled in response to a read enable signal from read/write circuit 10 to pass signals on leads 40 and 41 from memory 3 to respective inputs of an exclusive-OR gate 32 in which they are compared against each other for producing a 1 when there is a mismatch between their input logic states. The output of exclusive-OR gate 32 is applied to exclusive-OR gates 33 and 34 to which the outputs of AND gates 30 and 31 are also applied. The outputs of exclusive-OR gates 33 and 34 are coupled to the set input of flip-flops 35 and 36, respectively. The outputs of flip-flops 35 and 36 are applied to AND gates 37 and 38, respectively, that are enabled in response to a write enable signal from read/write circuit 10 to apply signals from the flip-flops through leads 40 and 41 to memory 3.

Each font in memory 3 is stored in a dot matrix of rows and columns, with each dot being represented by a plurality of bits. During a reflect mode, read/write circuit 10 is activated by controller 2 and supplies address signals to memory 3 to read one bit from a given memory cell of each successive row and a bit from another cell of the same row. The locations of such pair of bits are symmetrical to each other with respect to a vertical line that equally divides the dot matrix of the font. If each font is a raster-scanned font and is represented by $8 \times 8$ dots, four pairs of bits are formed by read/write circuit 10 with symmetrically located cells of each row as indicated by dotted lines in FIG. 3 and supplied in sequence to the bit reversal circuit 11.

Figure 3:
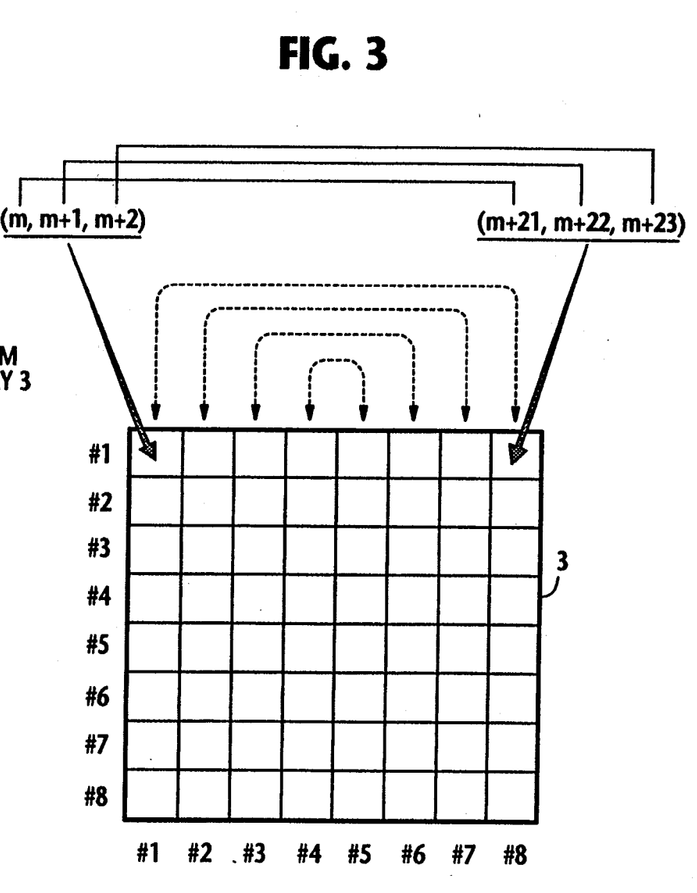
FIG. 3 is a view useful for describing the operation of a read/write circuit associated with the bit reversal circuit of FIG. 2.

The effect of the reflect circuit is to transpose the dot in each of the addressed cells to the other cell by reversing the logical states of their bits if they mismatch. If each dot is represented by three bits, the mth bit of row #1 and column #1 of the mth font forms a first pair with the (m+21)th bit of the same row but column #8 and this pair is supplied through leads 40 and 41 to bit reversal circuit 11. Likewise, the (m+1)th bit of column #1 forms a second pair with the (m+22)th bit of column #8, and the (m+2)th bit of column #1 forms a third pair with the (m+23)th bit of column #8. A similar process is repeated by forming successive pairs from columns #2 through #7 and the same process is continued for rows #2 to #8.

The operation of the reflect circuit of FIG. 2 is as follows. At the start of a read cycle for each pair of bits, flip-flops 35 and 36 are reset for clearing previous results. Assume that the logical states at lines 40 and 41 are "1" and "0", respectively, when a pair of bits is retrieved from memory 3. These binary signals are passed through AND gates 30 and 31 to exclusive-OR gate 32. As a result, a logic 1 is supplied to exclusive-OR gates 33 and 34 where it is combined with the logic-1 and logic-0 outputs of AND gates 30, 31. Thus, exclusive-OR gate 33 produces a logic 0 and exclusive-OR gate 34 produces a logic 1, which are respectively latched into flip-flops 35 and 36. During a subsequent write cycle, AND gates 37 and 38 are enabled and a logic 0 and a logic 1 appear, respectively, on leads 40 and 41. If the logic states of signals read out of memory 3 onto leads 40 and 41 are equal to each other, exclusive-OR gate 32 supplies a logic 0 to exclusive-OR gates 33 and 34, and hence, signals of the same logic state appear at the outputs of exclusive-OR gates 33 and 34 as the input signals. In this way, bit reversals occurs when there is a difference in logic state between bits of a pair read out of memory 3, and all bits of each cell of an addressed pair are, in effect, transposed to the other cell of the pair.

Figure 4:
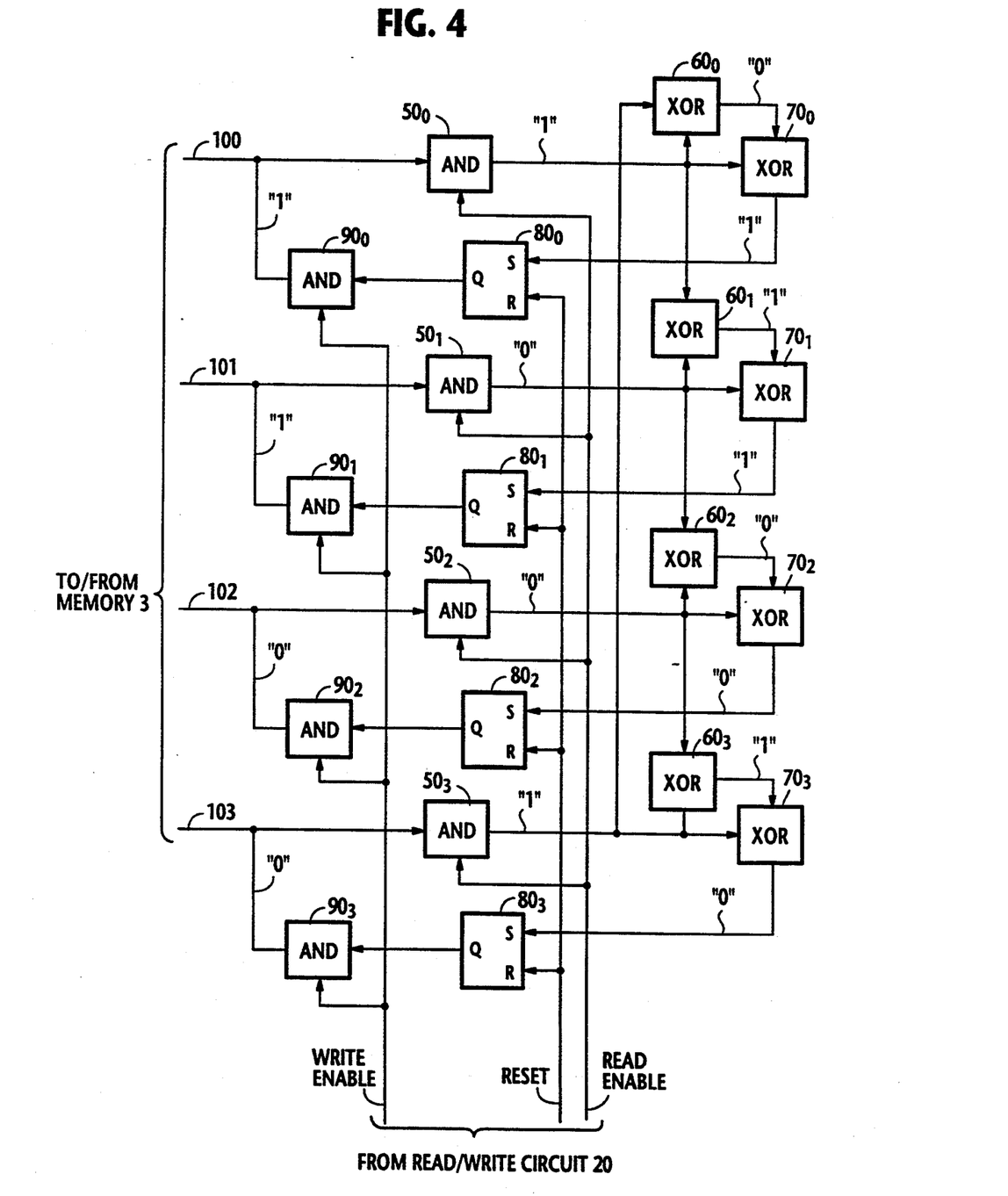
FIG. 4 is a circuit diagram of a bit reversal circuit for rotating a stored bit pattern.

As shown in FIG. 4, rotate circuit 5 comprises four identical circuits associated respectively with input leads 100 through 103. Each of these circuits comprises an input AND gate 50, exclusive-OR gates 60 and 70, a flip-flop 80 and an output AND gate 90. Each input AND gate $50_i$ (where i=0, 1, 2) passes a signal from the associated input lead to exclusive-OR gate $60_i$ and $70_i$ and to the exclusive-OR gate $60_{i+1}$ of adjacent circuit when enabled in response to a read enable pulse from read/write circuit 20, and the input AND gate $50_3$ applies its output to exclusive-OR gates $60_3$ and $70_3$ and to the exclusive-OR gate $60_0$. The output of exclusive-OR gates $70_i$ (where i=0, 1, 2, 3) is supplied to the set input of flip-flop $80_i$ whose output is coupled to AND gate $90_i$ which is arranged to be enabled in response to a write enable signal from read/write circuit 20 for coupling the output of the associated flip-flop to the associated input lead.

During a subsequent rotate mode, read/write circuit 20 is activated by controller 2 and supplies address signals to memory 3. The effect of the rotate circuit 5 is to give a 90-degree counterclockwise rotation to all bits in the dot matrix. To achieve this counterclockwise rotation, the read/write circuit 20 reads one bit from an upper row and, one bit from a left-side column, one bit from a lower row, and one bit from a right-side column out of memory 3 to form a set for coupling to the bit reversal circuit 21 where they are shifted, in effect, to one of the cells of the other three bits. The read/write circuit 20 repeats this process by subsequently shifting the locations of bits for readout.

Figure 5A:
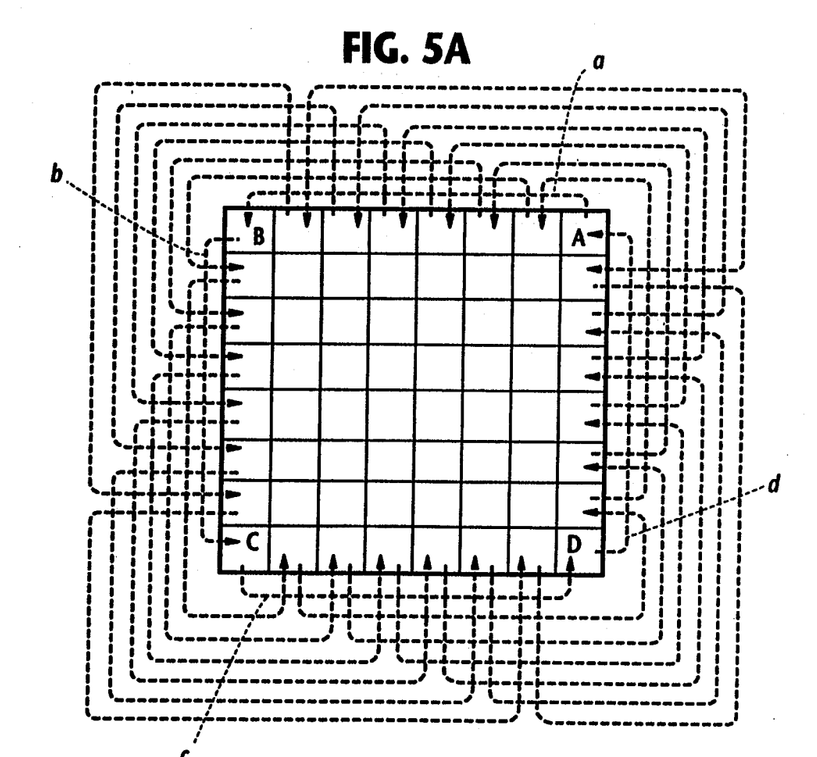
FIGS. 5A through 5D are views useful for describing the operation of a read/write circuit associated with the bit reversal circuit of FIG. 4.

As shown in FIG. 5A, a first bit is read out of the rightmost cell A of the top row, a second bit from the top cell B of the leftmost column, a third bit from the leftmost cell C of the bottom row and a fourth bit from the bottom cell D of the rightmost column, and applied to the bit reversal circuit 21 where bits in the cells A, B, C and D are respectively shifted, in effect, to cells B, C, D and A, respectively, as indicated by dotted lines a, b, c and d by reversing their logic states if the logic states of successive bits are different from each other in a manner to be described. If each dot is represented by three bits, the same process is, of course, repeated for the other two bits. As this process is repeated along the rows and columns, all bits of the top and bottom rows and all bits along the leftmost and rightmost columns are rotated 90 degrees counterclockwise.

Figure 5B:
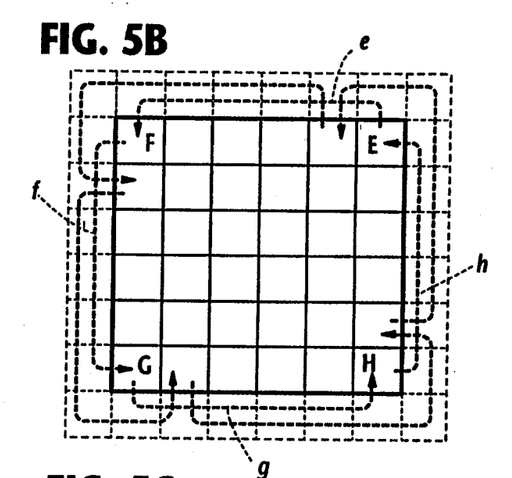

Following the 90-degree rotation of the outermost bits of the dot matrix, the read/write circuit 20 proceeds to perform a similar process on bits which are arranged one dot inner side with respect to the outermost bits as shown in FIG. 5B, so that bits in cells E, F, G and H are read out of memory 3 and fed into the bit reversal circuit 21 where they are shifted, in effect, to cells F, G, H and D, respectively, as indicated by dotted lines e, f, g and h. This process is repeated for all bits in the first inner cells, and in this way, they are rotated 90 degrees counterclockwise.

Figure 5C:
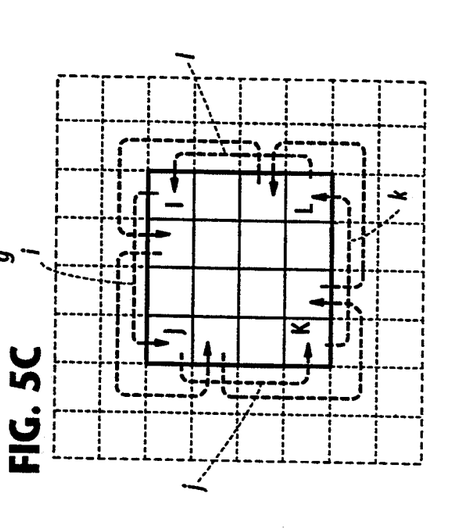
Figure 5D:
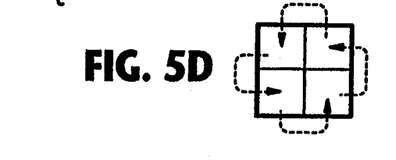

After the 90-degree counterclockwise rotation of the first inner cells, the read/write circuit 20 proceeds to perform a similar process on bits located two dots inner side with respect to the outermost bits as shown in FIG. 5C, so that bits in cells I, J, K and L are read out of memory 3 and fed into the bit reversal circuit 21 where they are shifted, in effect, to cells J, K, L and I, respectively, as indicated by dotted lines i, j, k and l. This process is repeated for all bits in the second inner cells, and in this way, they are rotated 90 degrees counterclockwise. In a similar manner, the last four bits are rotated 90 degrees counterclockwise as shown in FIG. 5D.

The operation of the rotate circuit 21 of FIG. 4 will be described in detail hereinbelow with reference to FIG. 5A. At the start of a read cycle, all flip-flops 80 are reset by the read/write circuit 20. Assume that bits stored in cells A, B, C and D are respectively logic 1, 0, 0 and 1. During a read mode, these logical values are applied through leads 100–103 to AND gates $50_0 \sim 50_3$ and thence to exclusive-OR gates $60_0$–$60_3$, respectively, for making bit-by-bit comparisons. The comparison between logic 1 and logic 0 by exclusive-OR gate $60_1$ results in a logic-1 output for coupling to exclusive-OR gate $70_1$ in which it is compared with logic 1 from AND gate $50_1$. The comparison between logic 0's by exclusive-OR gate $60_2$ produces a logic 0 for coupling to exclusive-OR gate $70_2$ in which it is compared with the logic-0 output from AND gate $50_2$. The comparison between logic 0 and logic 1 by exclusive-OR gate $60_3$ results in a logic 1 for coupling to exclusive-OR gate $70_3$ in which it is compared with the logic 1 from AND gate $50_3$, and comparison between logic 1's by exclusive-OR gate $60_0$ results in a logic 0 for coupling to exclusive-OR gate $70_0$ in which it is compared with the logic-1 output from AND gate $50_0$. Therefore, binary digits 1, 1, 0 and 0 are respectively stored into flip-flops $80_0$, $80_1$, $80_2$ and $80_3$ and made to appear at the outputs of AND gates $90_0$, $90_1$, $90_2$ and $90_3$ when enabled during a subsequent write mode.

Figures 6, 7:
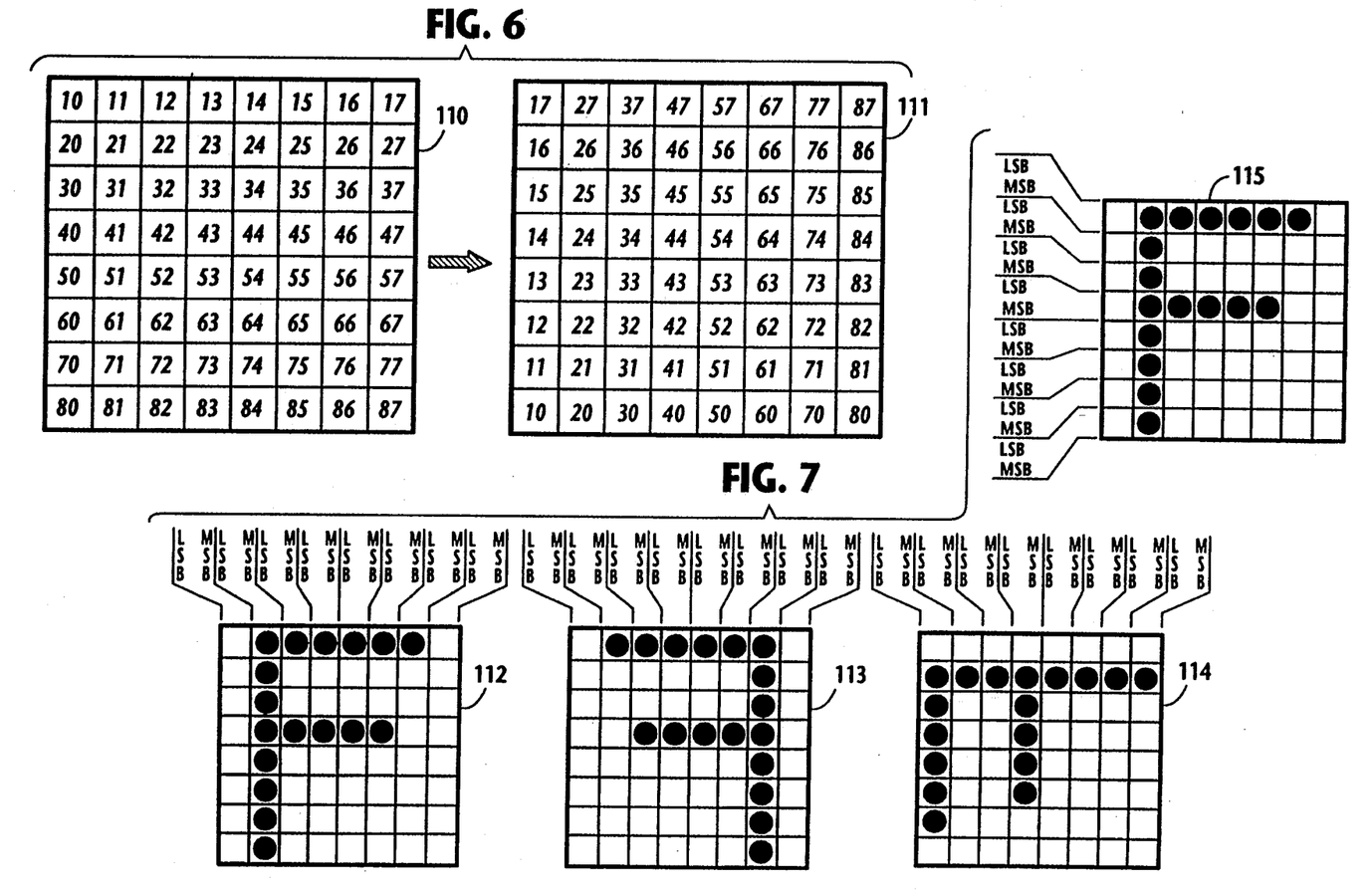
FIG. 6 is a matrix diagram for describing a 90-degree rotation of a stored bit pattern.
FIG. 7 is a matrix diagram for describing a sequence of matrices respectively illustrating original, reflected and rotated bit patterns for raster scanned fonts.

When the process is continued for all bits of an $(8 \times 8)$-dot font 110 shown in FIG. 6, the font is rotated 90 degrees counterclockwise and made to appear as shown at 111.

It is seen therefore that if the letter F is initially stored in an $8 \times 8$ dot format as shown at 112 in FIG. 7, the reflect circuit 4 produces a bit pattern 113 which is symmetrically opposite to bit pattern 112 with respect to the vertical center line of the $8 \times 8$ dot format. Subsequently, the rotate circuit 5 provides 90-degree counterclockwise rotation of the image 113 to produce a bit pattern 114 which is equivalent to a column-scanned bit pattern as shown at 115. In this way, a raster-scanned bit-mapped font is converted to a column-scanned bit-mapped font.

Figure 8:
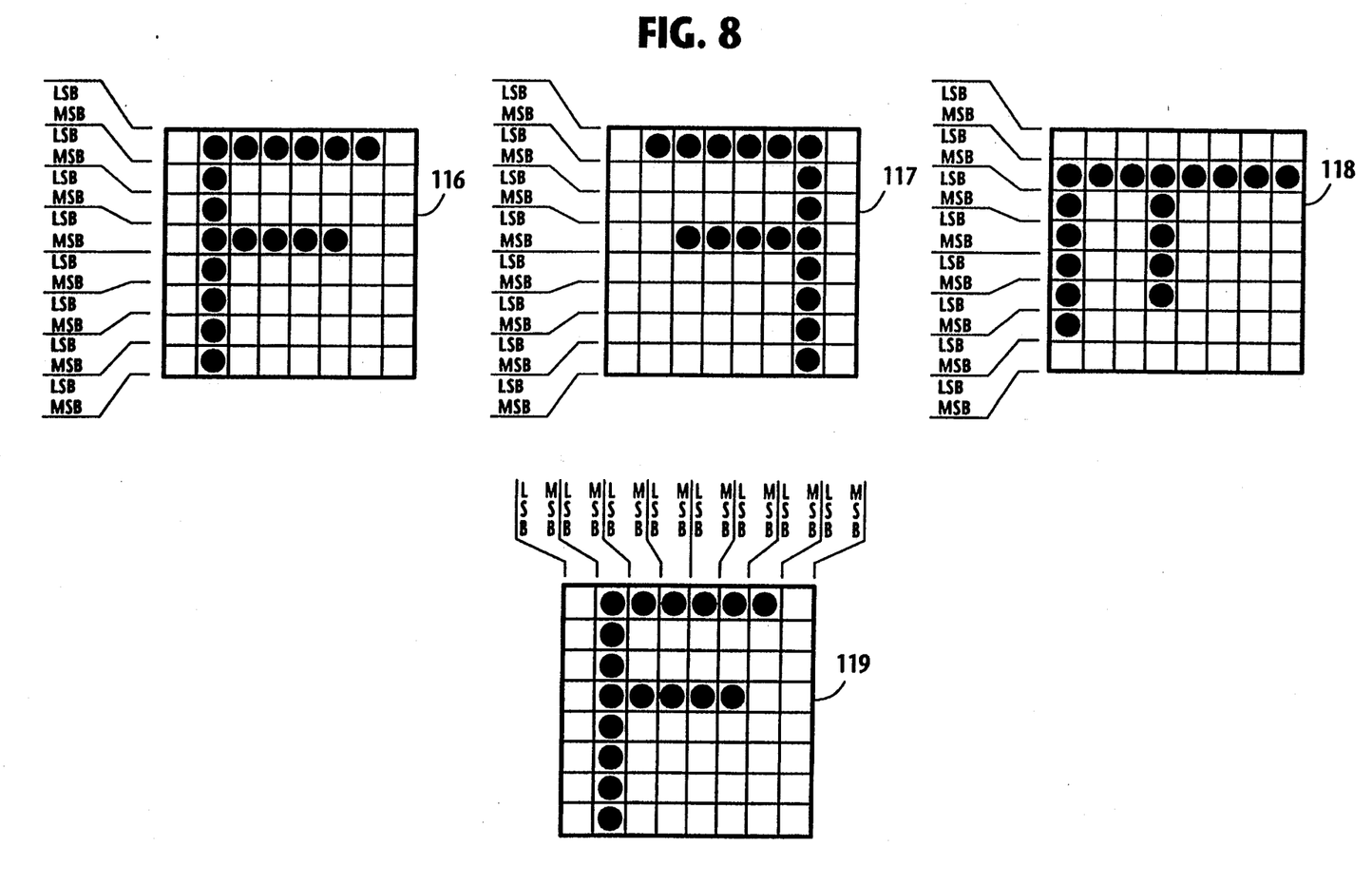
FIG. 8 is a matrix diagram for describing a sequence of matrices respectively illustrating original, reflected and rotated bit patterns for column scanned fonts.

If a column-scanned font is stored in memory 3 as shown at 116 in FIG. 8, it is converted to a column-scanned bit pattern 117 by the reflect circuit 4, and then to a column-scanned bit pattern 118 by the rotate circuit 5, which is equivalent to a raster-scanned bit pattern indicated at 119.

Figure 9:
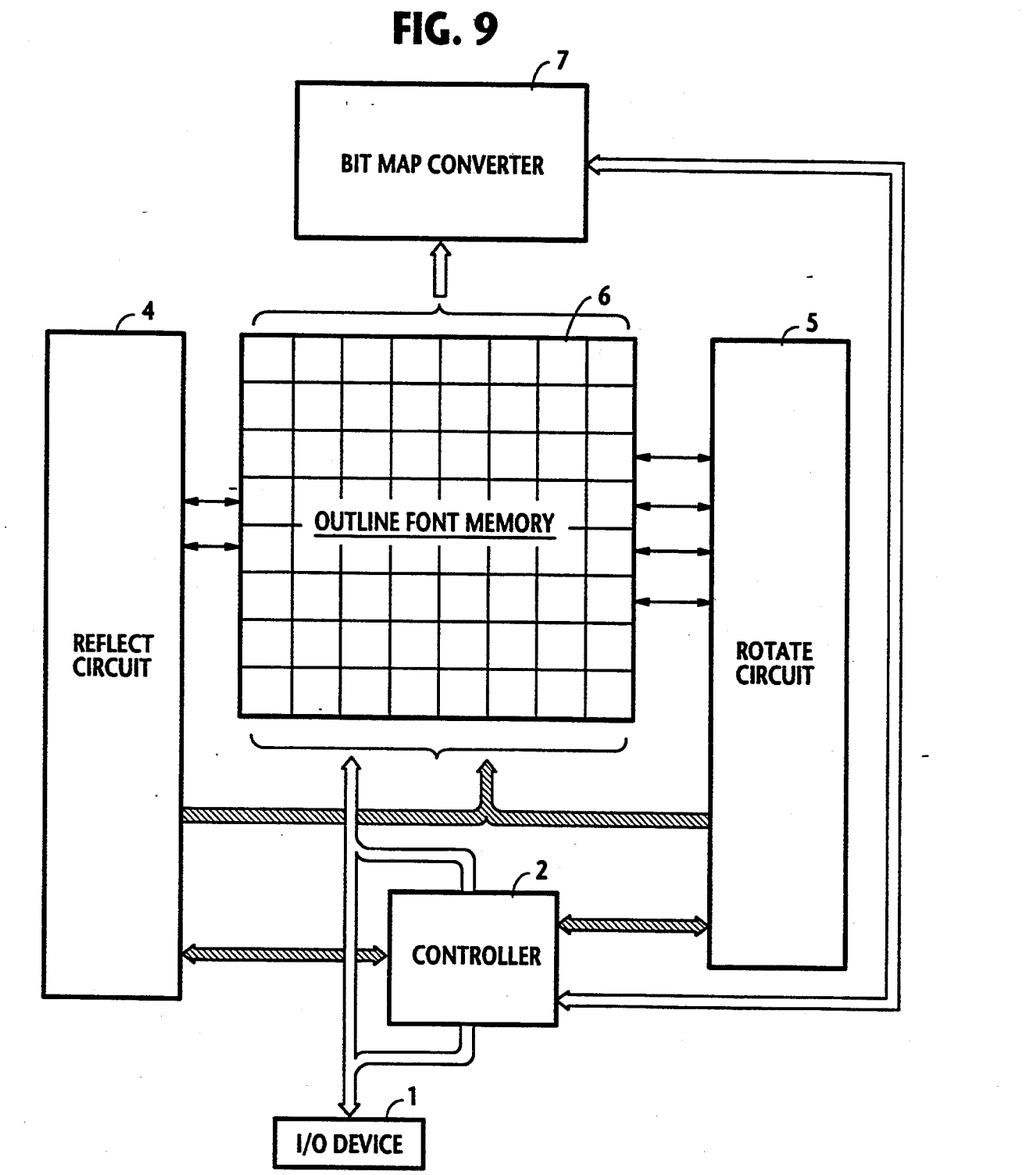
FIG. 9 is a block diagram of a font generation apparatus for processing outline fonts.
Figure 10:
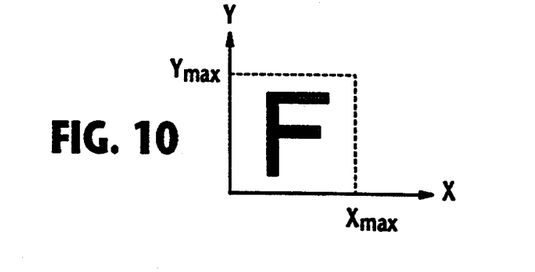
FIG. 10 is a view showing a coordinate system of an outline font stored in memory.

The present invention can be applied to an outline font as shown in FIG. 9. Fonts are stored in a memory 6 as outline coordinate data. To the memory 6 is connected to the reflect circuit 4 and the rotate circuit 5. A bit map converter 7 is connected to the memory 6 for converting outline fonts into bit-mapped fonts. Sequence controller 2 controls the reflect circuit 4 and rotate circuit 5 in a manner as previously described so that an outline font stored in memory 6 is reflected and rotated in the same manner as described above. Therefore, if the letter F is stored in memory 6 as shown in FIG. 10, outline data (x, y) is converted by the reflect circuit 4 into $(X_{max}-x, y)$. The reflected outline data is rotated 90 degrees counterclockwise by the rotate circuit 5 so that it changes to $(Y_{max}-y, X_{max}-x)$.

If the original font stored in memory 6 is of a raster-scanned type, the coordinate data of the outline font from memory 6 is converted by the reflect and rotate circuits 4 and 5 to a bit pattern identical to the pattern 114 of FIG. 7, and further converted by bit map converter 7 to a pattern identical to the column-scanned bit pattern 115. If the stored font is of a column-scanned type, it will be converted by the reflect and rotate circuits 4 and 5 to a bit pattern identical to the bit pattern 118 of FIG. 8 and further converted by bit map converter 7 to a bit pattern identical to the bit pattern 119.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A font generation apparatus for generating font data which can be used for printers having either a raster scan format or a column scan format, said apparatus comprising:
   a single memory comprising cells arranged in a matrix of rows and columns;
   first means for writing font data into said memory, said font data representing a matrix of dots each comprising a plurality of bits to indicate an image density of said dots;
   second means for converting logic states of said bits stored in said memory so that dots created by bits converted by said second means represent a reflection of dots of originally stored font data as reflected dots with respect to a line which equally divides said matrix; and
   third means for converting logic states of said bits stored in said memory so that dots created by bits converted by said third means represent a rotation of said reflected dots by 90 degrees with respect to said line.

2. A font generation apparatus as claimed in claim 1, wherein said second means comprises:
   means for repeatedly recalling two bits respectively from different cells of said memory which are located symmetrically with respect to said line; and
   means for comparing said recalled two bits with each other and for reversing initial logic states of said recalled two bits if said initial logic states of said recalled two bits differ from each other and for storing the reversed logic bits back into said cells of memory from which said bits are recalled.

3. A font generation apparatus as claimed in claim 1, wherein said third means comprises:
   means for repeatedly recalling four bits respectively from different cells of said memory which are located symmetrically with respect to a center point of said matrix; and
   means for comparing every two adjacent ones of said recalled four bits, and reversing a logic state of one of said adjacent two bits if the logic states of said two adjacent bits differ from each other and for storing the reversed logic bit back into the cell from which said bit is recalled.

4. A font generation apparatus as claimed in claim 1, wherein:
   said second means comprises
      means for repeatedly recalling two bits respectively from different cells of said memory which are located symmetrically with respect to said line; and
      means for comparing said recalled two bits with each other and reversing logic states of said recalled two bits if the logic states of said recalled two bits differ from each other and storing the reversed logic bits back into the cells from which said bits are recalled; and said third means comprises means for repeatedly recalling four bits respectively from different cells of the memory which are located symmetrically with respect to a center point of said matrix; and means for comparing every two adjacent ones of said recalled four bits, reversing logic state of one of said adjacent two bits if the logic states of said adjacent bits differ from each other and storing the reversed bit back into the cell from which said bit reversed is recalled.

5. A font generation apparatus for generating font data which can be used for printers having either a raster scan or a column scan format, said apparatus comprising:

a single memory comprising cells arranged in a matrix of rows and columns;

first means for writing outline font data bits into said memory, said outline font data bits representing an outline of a font in a coordinate system;

second means for converting logic states of said font data bits stored in said memory so that a reflected bit pattern created by said bits converted by said second means represents a reflection of a bit pattern of originally stored font data with respect to a line which equally divides said matrix as a reflected bit pattern;

third means for converting logic states of said font data bits stored in said memory so that a rotated bit pattern created by said bits converted by said third means represents a rotation of said reflected bit pattern by 90 degrees with respect to said line; and fourth means for converting said outline font data bits stored in said memory into a bit map pattern.

6. A font generation apparatus as claimed in claim 5, wherein said second means comprises:

a means for repeatedly recalling two bits respectively from different cells of said memory which are located symmetrically with respect to said line; and means for comparing said recalled two bits with each other and reversing first logic states of the said recalled two bits if said first logic states of said recalled two bits differ from each other and storing the reversed bits back into said cells from which said bits are recalled.

7. A font generation apparatus as claimed in claim 5, wherein said third means comprises:

means for repeatedly recalling four bits respectively from different cells of said memory which are located symmetrically with respect to a center point of said matrix; and means for comparing every two adjacent ones of said recalled four bits, and reversing a logic state of one of said adjacent two bits if said logic states of said adjacent bits different from each other and for storing the reversed logic bit back into the cell from which said bit is recalled.

8. A font generation apparatus as claimed in claim 5, wherein:

said second means comprises means for repeatedly recalling two bits respectively from different cells of said memory which are located symmetrically with respect to said line; and means for comparing said recalled two bits with each other and reversing logic states of said recalled two bits if said logic states of said recalled two bits differ from each other and for storing the reversed logic bits back into the cells from which said bits are recalled; and said third means comprises means for repeatedly recalling four bits respectively from different cells of the memory which are located symmetrically with respect to a center point of said matrix; and means for comparing every two adjacent ones of said recalled four bits, and reversing a logic state of one of said adjacent two bits if the logic states of said adjacent bits differ from each other and for storing the reversed bit back into said cell from which said reversed bit is recalled.

9. A method for generating a font which can be used with printers having a plurality of different scan formats, said method comprising the steps of:

storing first data of a first image in a memory having memory cells arranged in a matrix of rows and columns, each of said cells storing bits of said first image;

converting logical states of said bits of said first image such that second data is held in said memory, said second data representing a second image which is an image reflection of said first image with respect to a reflection line which equally divides said matrix; and changing logical states of bits of said second image such that third data of a third image is held in said memory, said third image representing a rotation of said second image by 90 degrees with respect to said reflection line.

10. A method for generating a font as recited in claim 9, wherein:

said converting step further comprises the steps of comparing a first pair of logical states of two bits extracted from two different ones of said memory cells respectively which are located symmetrically with respect to said reflection line;

reversing said first logical states of said two bits when said first logical states differ; and storing said reversed logical states of said two bits in said two different ones of said memory cells respectively; and said changing step further comprises the steps of extracting four bits from four different ones of said memory cells which are located symmetrically with respect to a center point of said matrix;

logically comparing each two adjacent bits of said four bits;

reversing a logic state of one of said two adjacent bits when said two adjacent bits differ from each other; and storing said one of said two adjacent bits reversed during said reversing step back into said memory cell from which it was extracted.

11. A method for generating a font as recited in claim 9, wherein said storing step further comprises the step converting outline font data bits into a bit map pattern.

12. A method as recited in claim 9 wherein said different scan formats are a raster scan format and a column scan format, said method further comprising the steps of:

determining whether a desired scan format is said raster scan format or said column scan format; and carrying out the converting step and the changing step when a scan format of font data stored in said memory is different than said desired scan format.

* * * * *